Oct. 24, 1939.   B. LONG   2,177,324
TEMPERED GLASS ARTICLE AND METHOD OF MANUFACTURING THE SAME
Filed March 29, 1937
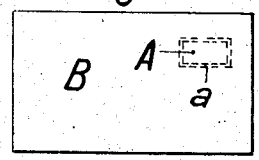
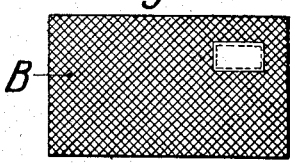
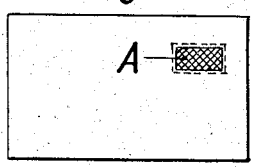
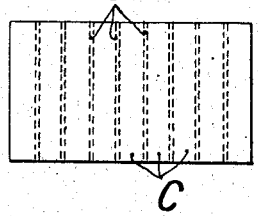
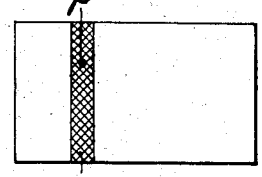
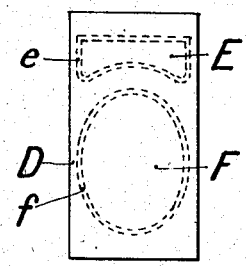
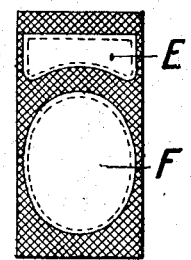
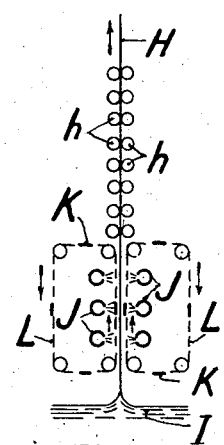
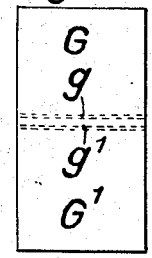
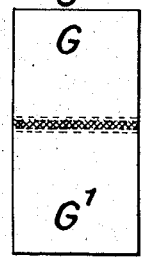
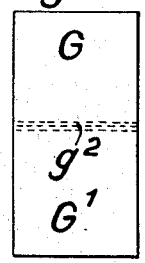
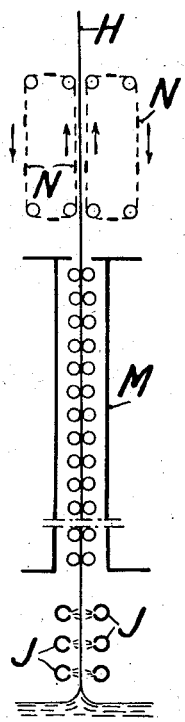
Inventor
Bernard Long
by Torrey, Cole & Gause
Attorneys Patented Oct. 24, 1939

2,177,324

UNITED STATES PATENT OFFICE 2,177,324

TEMPERED GLASS ARTICLE AND METHOD OF MANUFACTURING THE SAME

Bernard Long, Paris, France, assignor to The American Securit Company, a corporation of Delaware Application March 29, 1937, Serial No. 133,729
In France April 6, 1936

10 Claims. (Cl. 49—89)

This invention relates to tempered glass and particularly to tempered glass sheets or plates.

When a tempered glass sheet is broken at any point, the whole sheet breaks up into small pieces. This has been found objectionable, for example, in the case of glass sheets used as motor car windscreens, for the reason that the broken sheet usually remains in place and vision through it is altered.

Further it has hitherto been found impossible to cut a tempered glass sheet, since any attempt at cutting leads to fragmentation of the whole sheet.

The present invention has for its aim to remedy the above mentioned inconveniences.

The present invention has for its object tempered glass articles in which the fragmentation is arrested along any line by providing the article with a band of untempered glass along that line, the untempered band thus acting as a barrier to the spread of fragmentation.

According to the invention a tempered glass article has areas separated by a band in which the glass is untempered, so as to prevent fragmentation which might occur in one area from spreading to another area separated therefrom by the band.

In the case of windows for motor-cars and particularly of windshields, it is possible to limit a small surface situated in front of the driver by an endless narrow band of untempered glass surrounding it entirely. The fragmentation occurring in the zone of the windshield outer this small surface does not spread to said surface and inversely.

According to this invention it is possible to permit a tempered glass sheet to be divided along a predetermined line by providing on each side of the line, a band of untempered glass.

In the case of the continuous manufacture of tempered glass sheet it is possible to form at convenient intervals on this sheet untempered bands to permit its cutting.

The untempered bands may be produced either by preventing said bands to be tempered during the tempering of the sheet, or by tempering the whole surface and then detoughening said bands by a local application of heat.

In the accompanying drawing,

Figure 1 is a view of a motor car windscreen having separated areas A and B.

Figures 2 and 3 are views of the same screen when the glass is broken in areas B and A respectively.

Figure 4 is a view of a sheet of glass with separated areas.

And Figure 5 is a view of the same sheet with one area when broken.

Figure 6 is a view of a sheet of glass from which two pieces of predetermined shape are to be divided off, And Figure 7 is a view of the same sheet with the pieces divided off.

Figure 8 is a view of a sheet of glass adapted to be divided into two parts,

And Figure 9 is a view of the same sheet so divided.

Figure 10 is a view of a sheet of glass adapted to be cut into two parts.

Figures 11 and 12 show diagrammatically apparatus for the continuous manufacture of a tempered glass sheet provided with untempered bands to permit it to be cut at desired intervals.

In the windshield shown in Figures 1, 2 and 3, the area A is formed in front of the driver and separated from the remaining part of the windshield by a narrow band $a$ of untempered glass which surrounds entirely the zone A; this band $a$ has only a width of some millimeters. In order to manufacture this windshield according to the invention the band $a$ has been preserved from the thermic treatments which have produced the tempering of the glass sheet in the zones A and B. For example, it is possible to obtain this result, by applying on each face of the glass plate, after the plate has been brought out of the heating furnace and before it is submitted to the chilling operation, a narrow band of an insulating material such as asbestos carried by a movable frame and having the convenient shape to surround the area A. Then, the glass sheet is rapidly cooled for example by blowing a cooling fluid by the known apparatus. The asbestos band prevents the rapid cooling of the glass protected by it and the glass is maintained at a high temperature under said band while the parts A and B are rapidly cooled. The result is that the superficial layers of the glass under the band of insulating material are put under tension during their cooling while the superficial layers of the other parts of the glass are put under compression.

A windshield made according to the present invention is similar to an ordinary tempered windshield as it does not present parts of less visibility and the band surrounding the zone A is not visible.

But if a stone strikes any point of the area B, so as to break it, fragmentation of the area occurs up to the periphery of the frame a, leaving the area A within the frame intact. The glass then has the appearance of Figure 2, and clear vision is maintained through the area A. On the other hand, if the area A is struck by a stone so as to break it, fragmentation is limited to the area A and the area B remains intact for clear vision, the glass then presenting the apparatus of Figure 3. Complete fragmentation of the whole glass can occur only if the stone strikes the band a and since this need not be many millimeters in width there is only a small chance of this happening.

It is well understood that instead of dividing the windshield in two parts only, it is possible to divide it into as numerous zones as it may be desired.

Figures 4 and 5 show a tempered glass sheet which may be used for various applications such as windows, partitions, floors . . . In such applications, tempered glass is very advantageous owing to its special properties, specially its mechanical resistance and its elasticity. But, if it occurs a shock which produces breaking, the whole partition is divided into small pieces and yields.

Figures 4 and 5 represent a sheet of glass in which a plurality of narrow bands c are untempered, thus separating the sheet into a plurality of areas C. If the glass in any one area C is broken, fragmentation is limited to this area, and the whole sheet, including the broken area, if held in a frame, will generally remain in place.

The untempered bands may be given any form and location suited to the particular purpose for which the sheet is intended.

Figures 6 and 7 illustrate one way in which the invention may be used to obtain pieces of tempered glass of any desired shape from a sheet of glass. Bands e and f being peripheries of the pieces E and F, respectively, to be obtained are left untempered. The glass outside these bands is broken, when fragmentation is caused as in Figure 7, leaving the two pieces E and F intact.

Figures 8 and 9 illustrate a method of dividing a single sheet of tempered glass into two. Bands g and g¹ are left untempered, and the narrow stripe of tempered glass between the two bands is broken, as shown in Figure 9, leaving the two pieces G and G¹ intact. Alternatively, a broad band may be left untempered, and the sheet cut into two along the line g² in the centre of the band, by, for instance, a diamond cut.

Instead of protecting the band of glass during the chilling operation, to prevent its being tempered, it may be protected during the heating operation, to prevent the glass in the band reaching a temperature at which it is tempered by the chilling operation. Alternatively, an untempered band of glass may be produced in a tempered sheet by heating the glass in the band locally, as by an electrical heater. In the case of ordinary glass, it is sufficient to heat the band to about 500° C. for a suitable time, to de-temper it, and the surface of the glass is not thereby injured.

Figure 11 shows diagrammatically a method of execution of this application. An endless glass sheet H is produced by any known drawing method from a molten glass bath I and it is drawn by rollers h. As soon as it has been formed the glass sheet is subjected to the action of cooling means J. In order to reserve nontempered stripes, narrow and thin plates K made of insulating substance are applied against the sheet during the hardening by blasting. These insulating narrow and thin plates, as shown on Figure 11, which may be parts of drawing devices L, correspond, by example, with endless chains which bring them into contact with the glass sheet and move them forward with the speed of the glass sheet. By this method, untempered glass stripes, single as on Figure 10 or twined as on Figure 8, are obtained from place to place, either uniformly or periodically variably spaced, in order to permit the cutting.

Another method of realization is shown on Figure 12. In this case, the glass sheet H is tempered on its whole area by the cooling means J as soon as it emerges from the molten glass bath. Then, the glass sheet goes through an annealing sheath M. Afterwards, the cutting stripes are detempered by an application of single or twined heating devices N which are carried by endless chains which come one after another into contact with the glass sheet and go with it at the same speed. Either cutting may be immediately executed or the big glass sheets are stored in order to be subsequently cut. In all cases, in order to recognize the untempered places, the detempering devices are always provided with means which are destined to make impressions in the glass sheet.

It is well understood that the above described devices are only given as examples, as all details of realization the forms, sizes and substances which are used may vary in all cases without changing the principle of the invention.

Having thus described my invention, what I claim is:

1. A glass sheet for a windshield comprising at least an area in which the glass is tempered surrounded by another area of tempered glass but separated from the last mentioned area by a continuous band in which the glass is untempered.

2. A method to divide a tempered glass article into several pieces which consists in producing a band in which the glass is untempered along the periphery of each piece to be obtained and causing the fragmentation of the glass in the zones of tempered glass outside these pieces.

3. A tempered glass article comprising at least an area in which the glass is tempered surrounded by another area of tempered glass but separated from the last mentioned area by a band in which the glass is untempered.

4. The method of manufacturing tempered sheets of glass which consists in forming a continuous ribbon of glass and tempering the same by sudden cooling of portions of the surface thereof while leaving untempered band in such continuous ribbon extending from edge to edge of the continuous ribbon.

5. The method of producing a shaped article of tempered glass from a larger piece of tempered glass which comprises establishing a zone of untempered glass around the glass which is to form the article and causing fragmentation of the tempered glass exterior to said untempered area.

6. A method to divide a tempered glass article into several pieces which consists in producing in said article along the periphery of each piece to be obtained a band in which the glass is untempered and cutting the glass along the untempered band.

7. A method to divide a tempered glass article into several pieces which consists in producing along the periphery of each piece to be obtained a band in which the glass is untempered and causing the fragmentation of the glass in the zones of tempered glass outside these pieces.

8. A method to divide a tempered glass article into at least two pieces along a determined line which consists in producing on each side of said line bands in which the glass is untempered, said bands being separated by a strip of tempered glass, and in causing the breakage of the glass in the said tempered strip.

9. The method of manufacturing tempered sheets of glass which consists in forming a continuous ribbon of glass and suddenly cooling portions of the surface thereof corresponding to the size of the sheets to be obtained while leaving untempered bands in such continuous ribbon extending from edge to edge of the ribbon, and cutting the ribbon in said bands.

10. A glass sheet comprising areas in which the glass is tempered, at least one of these areas extending from one edge of the sheet to another and being separate from the adjacent tempered areas by bands which extend from one edge to another and in which the glass is untempered.

BERNARD LONG.